Patented Jan. 2, 1923.

1,440,566

UNITED STATES PATENT OFFICE.

FRITZ STRAUB, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF CHROMED DYESTUFFS.

No Drawing.  Application filed March 18, 1921. Serial No. 453,430.

*To all whom it may concern:*

Be it known that I, FRITZ STRAUB, a citizen of the Swiss Republic, and resident of Basel, Switzerland, have invented a new and useful Process for the Manufacture of Chromed Dyestuffs, of which the following is a full, clear, and exact specification.

I have found, that chromium compounds of azodyestuffs containing groups capable of being chromed can be obtained in a particularly smooth and simple manner, by treating the said azodyestuffs in alkaline solution with the chromed complex compounds, which result from the action of alkaline suspensions of chromium hydroxide on organic compounds containing more than one hydroxyl group as for instance polyvalent alcohols and phenols, tannins, saccharides, derivatives of cellulose, lignines.

The new process is carried out in the manner that in a first phase a solution of the chromium compound of the organic body is prepared and that in a second phase the dyestuff is introduced into the solution thus prepared and the whole mass heated until the dyestuff chroming is achieved.

The new process is illustrated by the following example.

Example 1.

46.8 parts of caustic potash are introduced gradually and while stirring into 100 parts of an aqueous paste of hydrate of chromium oxide (containing 14 parts of $Cr_2O_3$), care being taken that the temperature does not rise above 70° C. After a short time all caustic potash is dissolved. Then there are added 20.8 parts of glycerin while stirring. The mass is heated to boiling and maintained in ebullition until all the hydrate of chromium oxide, which remained undissolved before the addition of glycerine, is dissolved. To this solution brought to 200 parts by addition of water are added, while boiling and stirring, 71.2 parts of the dyestuffs derived from 1-diazo-2-oxynaphthalene-4-sulfonic acid and alpha-naphthol. The dyestuff dissolves quickly and the dark-blue coloration of the resulting solution turns rapidly to blue-violet. The mass is boiled for 10 hours in the vessel provided with a reflux cooler, the temperature of the reaction liquid being 100 to 102° C. The mass is then diluted with 600 parts of cold water and the liberated caustic potash is even neutralized with mineral acid and the dyestuff is salted out, filtered and dried. The chromed dyestuff obtained quantitatively dyes wool in an acid bath equal, deep-blue tints fast to light and fulling.

Example 2.

To a solution of potassiumglycerine chromite prepared according to Example 1, which has been diluted to 300 parts by volume, there are added 90 parts of dyestuff derived from diazotized 1-oxy-2-amino-4-methyl-benzene-6-sulfonic acid and betanaphthol. The process is further carried out as in Example 1. There is obtained a violet, chromed dyestuff giving on wool very equal tints of excellent fastness to light and of good fastness to fulling.

Example 3.

Into 560 parts of an aqueous paste of chromium hydroxide (containing 76.5 parts of $Cr_2O_3$) there are poured 252 parts of caustic potash, care being taken that the temperature does not rise above 70° C. After a short time all caustic potash is dissolved. Hereafter there are added, while stirring, 170 parts of gallic acid and the mass is boiled until the whole is dissolved. The solution thus obtained is diluted to 1400 parts by volume. The heating to boiling is further continued and to the boiling mass there are added 430.5 parts of the dyestuff derived from diazotized 1-oxy-2-amino-4-chlorbenzene-5-sulfonic acid and 1-phenyl-3-methyl-5-pyrazolone. The process is further prosecuted as in Example 1. There is obtained a red, well equalizing, chromed dyestuff giving on wool dyeings very fast to light and fulling.

An analogous result is obtained, when in this example the gallic acid is replaced by an equivalent quantity of glycose or tannin.

What I claim is:

1. The herein described process for the manufacture of chromium compounds of azodyestuffs containing groups capable of being chromed, which consists in reacting with organic compounds containing more than one hydroxyl group on alkaline suspensions of chromium hydroxide, introducing the azodyestuffs into the solution thus prepared and heating the whole mass until the dyestuff chroming is achieved.

2. The herein described process for the manufacture of chromium compounds of azodyestuffs containing groups capable of being chromed, which consists in reacting with organic compounds of the aliphatic series, containing more than one hydroxyl group, on alkaline suspensions of chromium hydroxide, introducing the azodyestuffs into the solution thus prepared and heating the whole mass until the dyestuff chroming is achieved.

3. The herein described process for the manufacture of chromium compounds of azodyestuffs containing groups capable of being chromed, which consists in reacting with polyvalent alcohols on alkaline suspensions of chromium hydroxide, introducing the azodyestuffs into the solution thus prepared and heating the whole mass until the dyestuff chroming is achieved.

4. The herein described process for the manufacture of chromium compounds of azodyestuffs containing groups capable of being chromed, which consists in reacting with glycerine on alkaline suspensions of chromium hydroxide, introducing the azodyestuffs into the solution thus prepared and heating the whole mass until the dyestuff chroming is achieved.

In witness whereof I have hereunto signed my name this 28th day of February, 1921, in the presence of two subscribing witnesses.

FRITZ STRAUB.

Witnesses:
JETER PROBST,
AMAND GRAME.